Oct. 11, 1966    C. F. SHAW ETAL    3,278,051
TOWING TROLLEY FOR PARKING VEHICLES
Filed Nov. 1, 1963    8 Sheets-Sheet 1
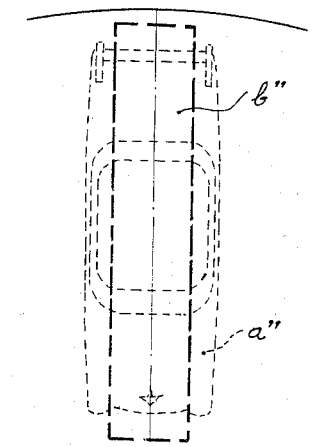
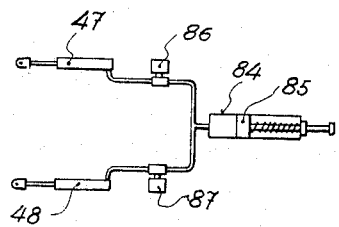
Fig. 19
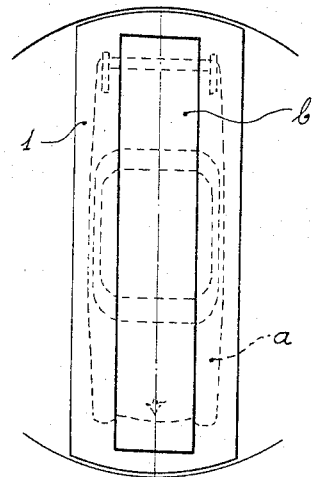
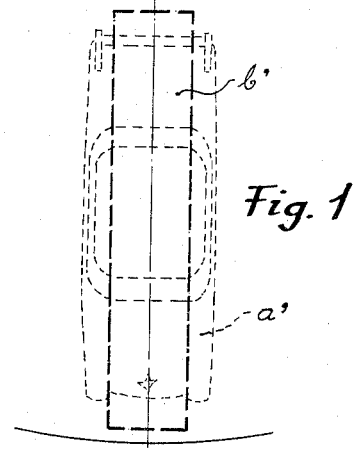
Fig. 1
INVENTORS
C. F. Shaw and J. G. Bravo
BY Richards & Geier
ATTORNEYS Oct. 11, 1966   C. F. SHAW ETAL   3,278,051
TOWING TROLLEY FOR PARKING VEHICLES
Filed Nov. 1, 1963   8 Sheets-Sheet 2

INVENTORS
C. F. Shaw and J. G. Bravo
BY Richards & Geier
ATTORNEYS

Oct. 11, 1966  C. F. SHAW ETAL  3,278,051
TOWING TROLLEY FOR PARKING VEHICLES
Filed Nov. 1, 1963  8 Sheets-Sheet 3
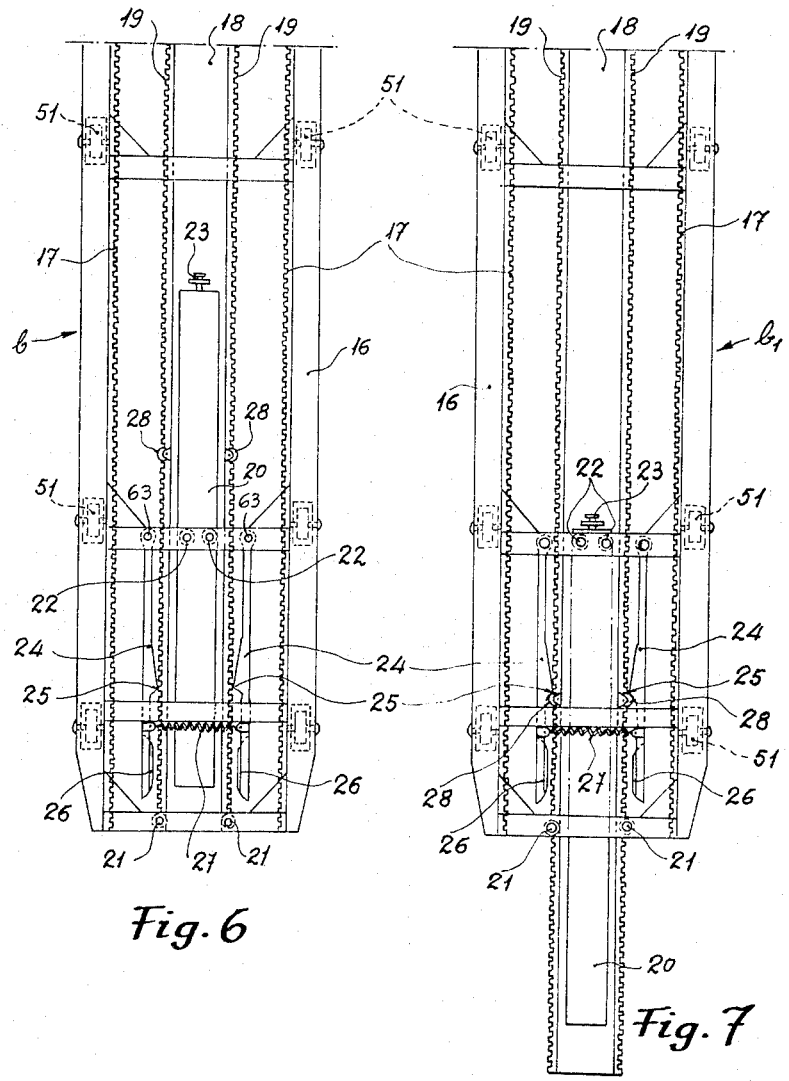
INVENTORS
C. F. Shaw and J. G. Bravo
BY Richards y Geier
ATTORNEYS INVENTORS
C. F. Shaw and J. G. Bravo
BY Richards & Geier
ATTORNEYS Oct. 11, 1966  C. F. SHAW ETAL  3,278,051
TOWING TROLLEY FOR PARKING VEHICLES
Filed Nov. 1, 1963  8 Sheets-Sheet 6

INVENTORS
C. F. Shaw and J. G. Bravo
BY Richards & Geier
ATTORNEYS

INVENTORS
C. F. Shaw and J. G. Bravo
BY Richards & Geier
ATTORNEYS

Oct. 11, 1966     C. F. SHAW ETAL     3,278,051
TOWING TROLLEY FOR PARKING VEHICLES

Filed Nov. 1, 1963     8 Sheets-Sheet 8

INVENTORS
C. F. Shaw and J. G. Bravo
BY Richards & Geier
ATTORNEYS

United States Patent Office

3,278,051
Patented Oct. 11, 1966

3,278,051
TOWING TROLLEY FOR PARKING VEHICLES
Casto Fernandez Shaw and Juan Giner Bravo, both of Madrid, Spain, assignors to Esproga S.L., Madrid, Spain, a corporation of Spain
Filed Nov. 1, 1963, Ser. No. 321,960
Claims priority, application Spain, Nov. 5, 1962, 282,186
8 Claims. (Cl. 214—16.1)

This invention relates to towing trolleys for motor vehicles, of the type known generically as "dollies" in the language of those skilled in the art.

Rationally designed parking installations permit parked vehicles to be arranged in the minimum possible space with the object of achieving the principal aim of the optimum utilisation of the land.

The manoeuvres to be performed by vehicles in such small spaces may cause difficulties, with the consequent risk of, for instance, damage to the vehicles. A consideration to be taken into account by designers is that the movements which each vehicle must make in order to be fitted into the parking installation or to be extracted therefrom should be of the greatest possible simplicity.

For the convenience of the user and in order to impart the greatest possible speed to the movements and manoeuvres which the vehicles have to carry out, so-called dollies or transporting trolleys or trucks are used which vary in design, arrangement and operation, these being always in keeping with the characteristics of the parking installation in connection with which they are used.

However, it is not only the arrangement of the parking installation that is the determining factor in the choice between one type of dolly and another and in the optimum utilisation of the possibilities of the dollies. The varying technical characteristics of the very wide range of motor vehicles, which differ, in particular, as regards their wheel dimensions, axle heights, track and wheel base, for example, make a completely satisfactory dolly design illusory.

The trolley or "dolly" which is the subject of this invention operates completely satisfactorily with the entire range of motor vehicles which it is assumed will use parking installations of one kind or another. This is due to the fact that special attention has been paid in its design to those circumstances, characteristics and features which undergo the least change as between one model or type of vehicle and another.

It is one object of this invention to provide a trolley or dolly which will create the possibility of rectilinear movement of a vehicle, not only in the two opposite directions corresponding to entry into and exit from the space which is assigned to the vehicle, but also in the directions extending on opposite sides of the retracted position of the said trolley, so as to render possible, without any change of arrangement, manoeuvring over an area of the first-mentioned space which is symmetrical with respect to the centre of the dolly.

It is another object of the invention to provide a dolly in which the various elements thereof constitute a compact assembly when the dolly adopts the position of equilibrium or rest. In keeping with this idea, the trolley mentioned is of a type adapted to be extended from the said position of reference.

It is a further object of the invention to provide a dolly with which there will be the possibility of variation in the line of extension of the dolly, by rotation of its axis, so as to enable a vehicle to be conveyed in any desired direction; the already mentioned extensibility in two directions accordingly enables the vehicle to be conveyed in any direction and sense.

The invention also provides the possibility of lateral movement of the dolly.

Yet another object of the invention is to provide a dolly which will make possible the handling of vehicles at different levels or floors. The maximum retraction of the component elements in the position of rest or equilibrium facilitates incorporation on lifting or hoisting means.

It is also an object of the invention to render possible the collection of a vehicle by the transporter from the position in which it is left by its driver, irrespective of the possible eccentricity of this position relatively to the ideal position.

The towing trolley for motor vehicles according to this invention, for carrying out parking manoeuvres, is therefore designed to be mounted for preference on a central platform which is capable of vertical movement and also rotary movement or movement in lateral direction, for the purpose of taking each vehicle from the place at which it is left by its driver, at the entrance of the parking installation, conveying it to the central position, causing it to reach the appropriate floor and conveying it from the central platform to an available space, and which is also capable of carrying out the whole sequence in the reverse order, until the vehicle is left at the doorway of the parking installation at the disposal of its driver.

To fulfill these aims, the towing trolley of the invention operates by a pushing and directing action on the wheels of the vehicle, being coupled to these wheels by means of a device consisting of articulated parallelograms having an expansion suitable for the different sizes of vehicles which are encountered in practice and with a directing and self-centering effect on the same.

The basis of the invention is that the respective elements thereof, for coupling to each of the four wheels of a vehicle, effect a simultaneous movement of lateral and longitudinal expansion.

With the object of making more clearly understandable the nature, aim and scope of the invention, the manner in which the same can be carried into practice and other no less interesting circumstances and features, a detailed description is given hereinafter with reference to the accompanying drawings which show, by way of example only and without being in any way limitative, one form of installation constructed in accordance with the invention.

In the said drawings:

FIGURE 1 is a diagrammatic plan view in which the dolly is shown in three characteristic positions, that is to say, on the central platform and extended in opposite senses in a given direction; the position of a motor car is shown in dash lines in each case, so as to make the position which the vehicle occupies clear;

FIGURES 2, 3, 4 and 5 relate to the platform, which is capable of vertical movement and of horizontal rotary movement or movement in lateral direction, and on which provision is made for mounting the dolly of the invention; in FIGURES 2 to 5 the platform is shown respectively in plan view, in side elevation, in bottom view from below and in end view;

FIGURES 6 and 7 show one half of the dolly in plan view, simplified so as to show only the traction mechanism, the figures showing the dolly with its elements retracted and extended, respectively, in a given direction;

FIGURES 8, 9, 10 and 11 show the platform and dolly assembly in plan view in four different positions, so as to illustrate the extension movement of the latter in a given direction; the stages of this movement are, respectively, the central position of rest or equilibrium, a position during extension, the position when the two sliding parts which make the dolly extensible are mutually interlocked and a position very close to the end of the extension;

FIGURE 19 is a small detail of the arrangement of a hydraulic accumulator for compensating stresses in the bars of the mechanical articulations of the transversely extensible elements;

Figure 2:
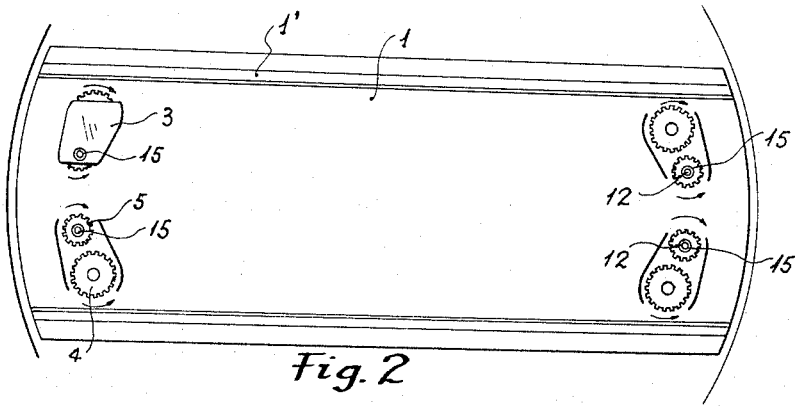

Referring to the drawings, the reference 1 designates a platform capable of vertical movement, so as to enable a trolley carried thereby to reach any one of the levels or floors of the parking installation. The platform will also be capable of either rotary movement or lateral movement, according to whether radial or orthogonal distribution of vehicles between the parking spaces is involved.

In the drawings the platform 1 is shown, merely by way of example, as being designed for rotary operation in a radial parking installation.

In FIGURE 1, the reference $a$ designates a vehicle (shown in dash lines) and the reference $b$ a trolley such as that which forms the subject of the invention, incorporated in the platform 1; the said trolley is shown at $b'$ and $b''$, corresponding to the positions adopted when it is extended out of the platform 1 in one sense or the other, in the direction shown; the corresponding positions of the car are indicated at $a'$ and $a''$.

The said platform 1 incorporates the mechanical means for extending and retracting the trolley.

Figure 3:
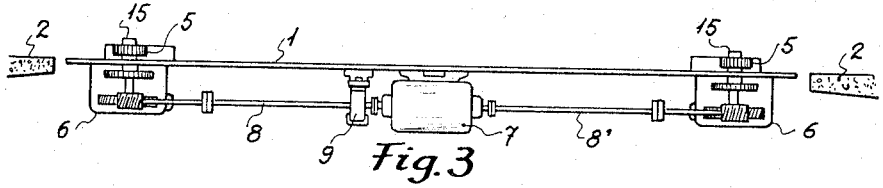
Figure 4:
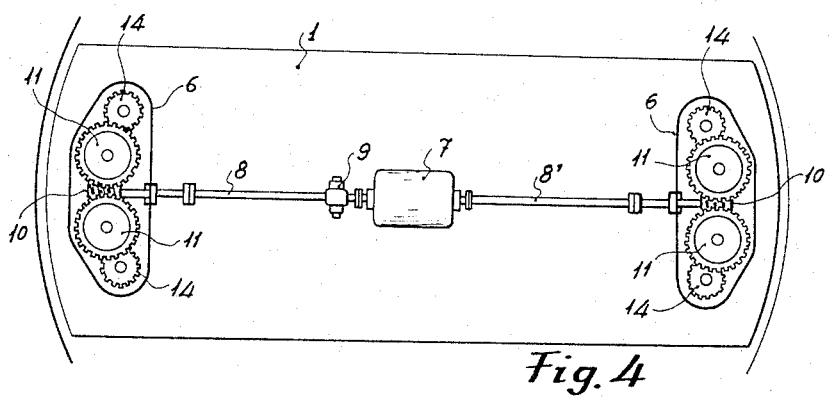

Thus, when the vehicle is on the platform, it can be conveyed beyond it to the parking zone 2 (see FIGURE 3) on the appropriate floor; or it can be conveyed to the platform 1 from the zone in which it is located. All this can be done without utilising the vehicle's own power.

The device which, for this purpose, is arranged on the platform 1 can be seen in FIGURES 2 to 5.

On the upper surface of the platform 1 there are arranged four pairs of toothed wheels keyed on corresponding vertical shafts which receive their movement from the under-surface of the platform, for which purpose, of course, the shafts extend through the platform 1.

The said four pairs of toothed wheels are of identical construction. Each pair is enclosed in a cover, through the sides of which there projects a sector of each of the wheels of the pair. Only one of these covers 3 is fully shown in FIGURE 2, the upper portions of the three remaining covers being shown removed, to illustrate the pairs of wheels or pinions more clearly.

In each pair, one pinion 4 is of a pitch diameter substantially larger than that of the other pinion 5. The shafts of the two pinions are sufficiently far apart from the teeth of the pinions 4 and 5 not to mesh with one another. The pinion 4 in each pair is close to one edge of the platform 1, while the pinions 5 of adjacent pairs are relatively close to one another.

The four pairs of pinions are distributed symmetrically with respect to the longitudinal axis of the platform 1 and are close to the ends of this platform, having regard to the direction of movement of the trolley. On the lower face of the platform 1 there are arranged the two boxes or casings 6 (one corresponding to each of the two pairs of pinions arranged at the corresponding end of the upper surface of the platform). The casings 6 enclose, in an oil bath, the gears producing rotation of the pinions 4 and 5.

An electric motor 7 in the centre of the lower surface of the platform 1 transmits its turning moment to the gears in each casing 6 by means of a longitudinal shaft 8 or 8'. One of these (the shaft 8, for example) incorporates immobilisation means 9 for these mechanisms.

The ends of the shafts 8 and 8' are introduced into the casings 6 using axial thrust bearings, and also seals for avoiding the escape of lubricant from the said casings 6, and the shafts terminate in respective worms 10, each of which meshes with the pair of twin gears 11. The latter are keyed on the shafts 12 of the respective pinions 5 mounted at the opposite face of the platform 1.

On these same shafts and also within the casing 6 there are keyed pinions 13 which mesh with a like number of other pinions 14 of equal pitch diameter, the latter being keyed on the shafts of the pinions 4 provided at the upper face of the platform 1.

The following result is achieved with this mechanical arrangement:

By means of the single motor 7 on the lower part of the platform 1 and the single stopping device 9 it is possible to produce, at will, the rotation and stopping of the assembly consisting of the eight pinions which are disposed on the upper face of the platform 1 and which produce the extension and retraction of the elements of which the trolley is composed; all the pinions 4 and 5 rotate at the same angular speed, due to the meshing between the gears 13 and 14.

Figure 5:
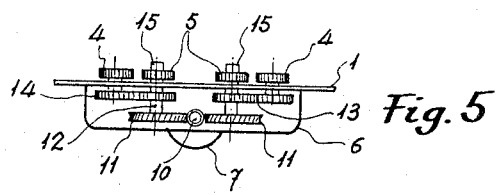
Figure 8:
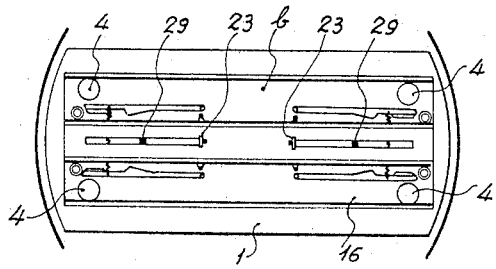
Figure 9:
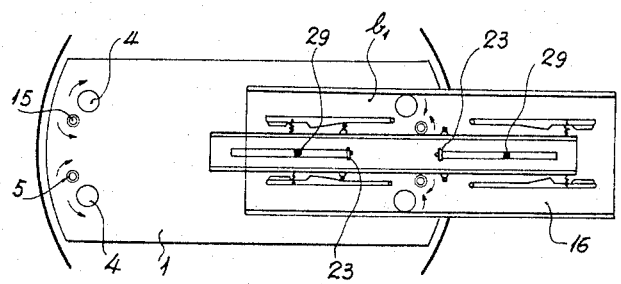

The meshing conditions will be apparent in a particularly clear manner from FIGURE 5.

For a given direction of rotation of the motor 7, the pinions 4 and 5 will rotate in the direction illustrated by arrows in FIGURE 2. To this direction of rotation (and the same can be said of the opposite direction) there will correspond either extension or retraction of the trolley (it is immaterial which), according to the position in which the same is located when rotation of the motor 7 commences.

Each shaft carrying a pair of pinions 5 and 13 is extended above the corresponding pinion 5 and the projecting portion carries a freely rotatable bush 15.

With this arrangement, the trolley $b$ is very easily displaceable; at a position very little beyond the position provided as the limit of extension, the trolley is freed from the pinions 4 and 5 which it engages for its normal operation; the withdrawal of the trolley is thus immediately possible.

FIGURES 6 and 7 show diagrammatically half of a trolley in accordance with the invention, from its transverse axis to one end. The positions in which the trolley is shown in FIGURES 6 and 7 correspond respectively to the position $b'$ and to the position $b'$ or $b''$ of FIGURE 1.

Referring to FIGURES 6 and 7, the trolley consists of an outer frame or body 16 provided throughout the length of its sides with inwardly directed racks 17. An inner body 18 can slide longitudinally in relation to the frame 16, so as to project at one end or the other (see FIGURE 7). The body 18 is formed at its edges with outwardly directed racks 19.

The body 18 has an aperture 20 formed near each end thereof. The body 18 is guided in its longitudinal sliding movement by rollers 21 which bear against the side edges thereof, at their upper parts above the racks 19; rollers 22 guide the said body 18 by bearing against the plain edges of each aperture 20 while rollers 64 suspend the body 18 from the body 16.

The relative longitudinal displacement of the frame 16 and the body 18 is limited by the stop or stops 23 disposed at the end of the aperture 20, which strike against a fixed stop or bearing surface fast with the frame 16 or against the rollers 22. The stop 23 is adjustable so as to permit a suitable adjustment in accordance with the conditions of extension which will be more clearly described hereinafter.

Thus, as a result of the rotation of the pinions 4 and 5 meshing with the racks 17 and 19, relative longitudinal displacement of the two parts 16 and 18 of which the trolley is composed is produced; the outer part 16 moves more quickly than the inner one 18 and, as a consequence thereof, the latter is delayed.

At a certain moment, the outer body 16 will have been extended so much beyond the platform 1 that its two racks 17 will be out of engagement with the corresponding pinions 4; however, the inner body 18 will still cause the trolley to advance, by means of its racks 19 which are still in mesh with the pinions 5. For this purpose, however, it is necessary for the outer body 16 to be automatically interlocked with the inner body 18.

To this end, pairs of levers 24 rocking horizontally about one of their ends are provided. Each of these levers has at its inner edge beak or tooth 25 in the central zone thereof and a cam profile 26 in the zone of the free end.

In a suitable zone, such as, for example, that between the beak 25 and the cam 26, there acts a spring 27 which tends to draw the levers 24 of each pair closer to one another. That pair of levers 24 which corresponds to the end where extension takes place at each movement of the towing trolley b acts, at a certain moment, to interlock the parts 16 and 18 which, until that moment, have been extensible relatively to one another.

The manner of achieving this interlocking can be appreciated from FIGURES 6 to 11.

Small lateral brackets support small rollers 28 at certain positions on the outside edges of the inner body 18; as the gradual displacement of the inner body takes place with respect to the outer body of the trolley b, as a consequence of the different linear speeds of the toothed wheels 4 and 5, the rollers 28 draw nearer (during the movement of extension) to the corresponding beaks 25 of the levers 24. That side of each of these beaks from which the roller 28 approaches has a gentle slope while the opposite side has a steep slope.

At the same time, the cams 26 bear on the bushes 15 and this causes the locking levers 24 to be displaced away from one another, against the action of the spring 27. When, however, the beaks 25 have passed the rollers or casters 28 and the latter are located at the steep side of the beaks 25, the corersponding cams 26 move beyond the bushes 15 carrying the pinions 5 (FIG. 11) and then the said casters bear on the said steep sides and prevent possible backward movement, since so considerable a slope does not afford the mechanical advantage required for overcoming the tension of the spring 27. In this way interlocking is produced; this being so, the stop 23 is disposed in such manner that it is the actual longitudinal component of the force transmitted from the spring 27 to the caster or roller 28 by the steep portion of the beak 25 that presses the stop strongly against the corresponding bearing surface fast with the outer body 16 of the trolley b; this is facilitated by the adjustment which, as has already been indicated, is permitted by the said stop.

FIGURES 8 to 11 illustrate stages of the extension of the trolley b from its centered position on the platform 1 to the position in which it is fully extended to the right. In all these figures the reference 29 designates a hypothetical bearing surface for the adjustable stop 23.

Figure 10:
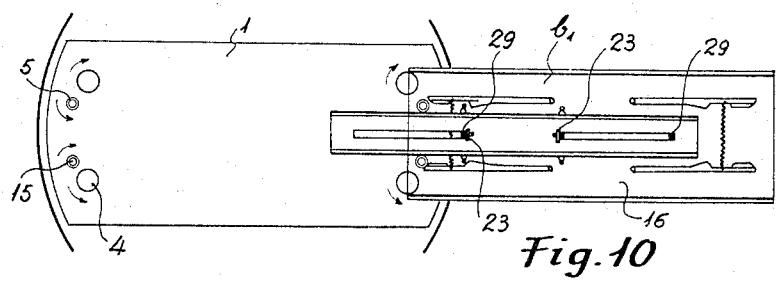
Figure 11:
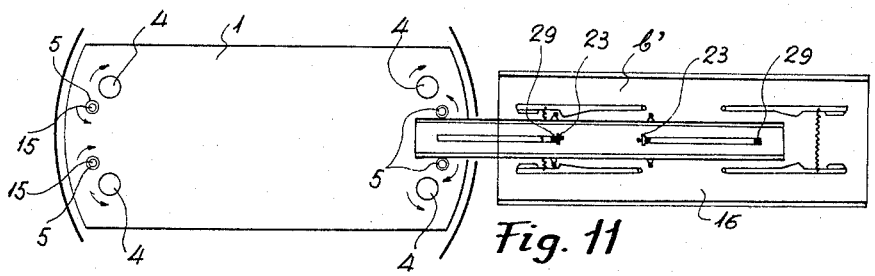

In FIGURE 10 the interlocking of the component parts of the trolley b is beginning and, from then on, the trolley is conveyed solely by engagement between the racks 19 and the pinions 5. This has the important advantage of permitting a slower movement just as extension is terminating and retraction is commencing.

When separation of a pair of levers 24 becomes necessary for the purpose of releasing the casters or rollers 28, striking of the cams 26 against the suitably situated brushes 15 previously mentioned takes place; as a consequence, the appropriate separation of the levers 24 occurs. A delay is provided in the contact of the cams 26 with the bushes 15; the racks 17 will come into contact previously with their corresponding toothed wheels and, on mutual displacement being initiated in this way between the telescopic parts of the trolley, the rollers 28 will produce a separating thrust on the levers 24 by bearing against the steep zone of each such lever, which thrust will be absorbed by the spring 27.

The mutual locking of the two bodies of the trolley b is therefore produced when the rollers 28 surmount the crests of the beaks 25. When the rollers reach the steeper slope of the beaks 25, a small, but sharp, relative movement is produced between the parts mentioned, by the action of the spring 27, through the intermediary of these slopes. In fact, the part 18 remains in mesh with its corresponding pinions and the part 16, which has reached the position in which it is released from engagement with the pinions 4, is rapidly freed from this engagement as a consequence of the said small and sharp movement; this has an advantage for operation in general and for the lift of the teeth of the racks and pinions in particular.

Figure 12:
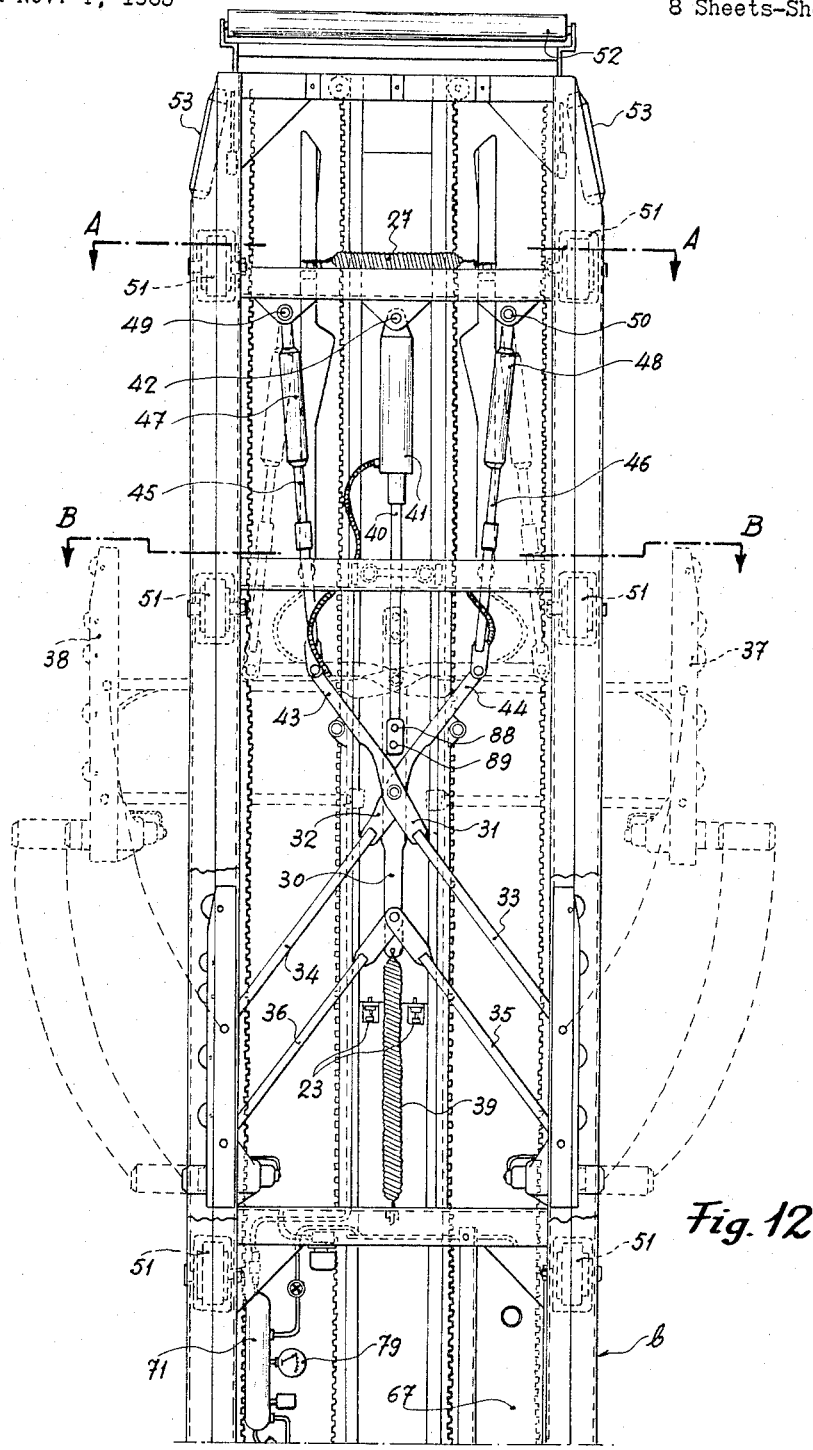
FIGURE 12 is a view corresponding to FIGURE 6, but drawn to a larger scale so as to show details.
Figure 13:
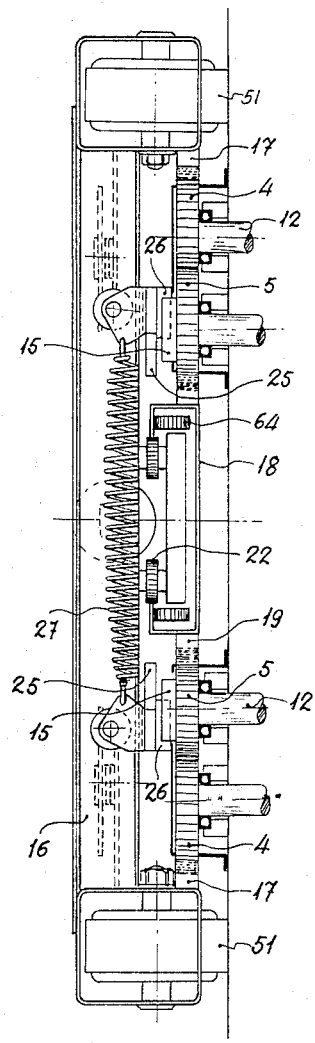
FIGURES 13 and 14 are sections on the lines A—A and B—B, respectively, in FIGURE 12.
Figure 14:
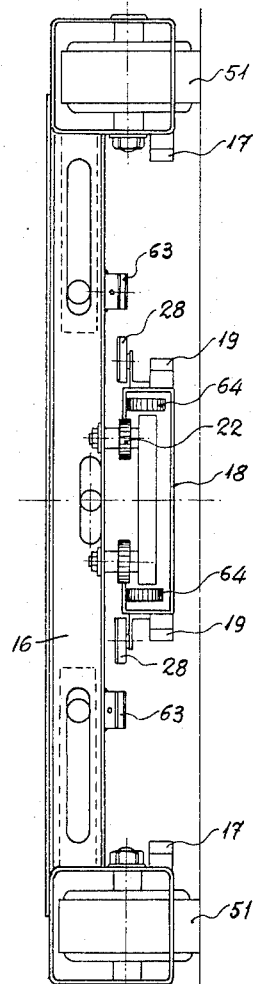

FIGURES 12, 13 and 14 give fuller details concerning the arrangement of the trolley. The latter, as will be appreciated, can attain a displacement greater than its length.

The trolley b has on each side thereof a pair of transversely extensible shoes (one shoe of each pair for each wheel of the corresponding side of the vehicle). When, during its extension movement, the trolley arrives below the vehicle to be towed, the said shoes emerge transversely and come into contact with the inner face of each wheel and fit perfectly against the same at no great height from the ground. These shoes have rolling means adapted to bear against the face of the corresponding wheels and rolling and pushing means adapted to bear automatically on the periphery of the said wheels.

When the trolley has to be retracted, leaving the vehicle in the place reached, the sequence of movements begins, the first movement being retraction of the shoes to which reference has been made.

The following means are provided for carrying out all these movements.

Corresponding shoes 37 and 38 at opposite sides of the trolley are articulated to a central longitudinal bar 30 (FIG. 12). This articulation is effected by means of the pairs of bars 33, 35 and 34, 36, which form two articulated parallelograms with a common side constituted by the bar 30.

The bar 30 is subjected to a pulling stress at one of its ends by the spring 39 which is in line with it when in the inoperative position. At the opposite end, the bar is connected by means of bolts 88, 89 to a rod 40 which is firmly connected with the piston of a hydraulic assembly the cylinder of which is shown at 41; this assembly is articulated at its other end to the frame of the part 16, at 42.

One pair of bars, meeting at an apex on the bar 30, namely the bars 33, 34 in FIG. 12, are extended at 43, 44 beyond their pivot to form scissors. The free ends of the extensions 43, 44 are articulated to those of rods 45, 46; the latter form the sliding parts of the hydraulic devices 47, 48, the operation of which will be described in detail with reference to FIGURE 19.

The said hydraulic devices are articulated at 49 and 50 respectively, to the frame of the part 16.

The sets of gears arranged on the platform 1 and already fully described have the function of driving the trolley $b$ in its movements of extension and retraction. However, with the object of ensuring a necessary and satisfactory rolling support during these movements, rollers or wheels 51 are provided which rest on the floor, either of the platform 1 or of the structure 2 of the parking arrangement, according to the positions adopted by the trolley during its operation. The rollers or wheels 51 are guided laterally (at least those at the ends) within the platform 1 by means of rails 1' in order to obtain perfect engagement of the racks with their driving wheels during the telescoping process.

In order to facilitate the arrival of the trolley below a vehicle, the former being in contact with possible projections of the latter, the front or end rollers 52 have their axes arranged perpendicularly of the direction of movement while oblique rollers 53 are provided at the ends of the sides. Each roller 52 can move perpendicularly to itself, both backward and downward, on encountering any obstacle. Switches are thereby actuated and stop the trolley.

Before explaining how the operation of extending the lateral shoes is performed, it will be appropriate to describe the arrangement of the same.

Figure 15:
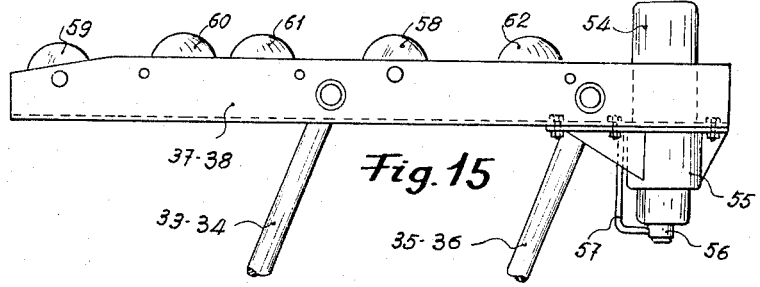
FIGURES 15 and 16 are a plan view and an elevational view respectively, of one of the shoes which are extensible laterally on the dolly so as to fit against the inner face of the respective wheels of the vehicle to be handled; some or all of the necessary rolling or revolving elements are balls.
Figure 16:
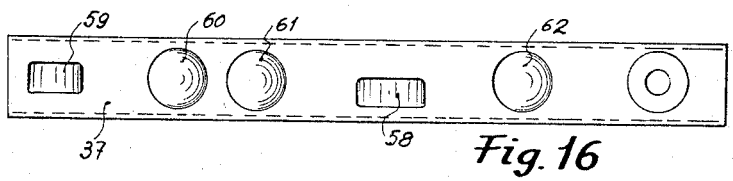
Figure 17:
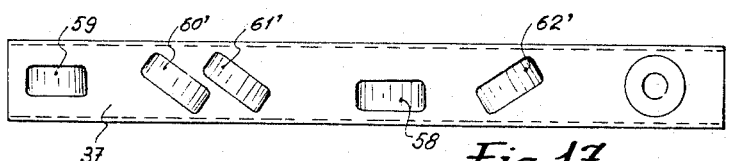
FIGURE 17 is similar to FIGURE 16, but with the balls of FIGURE 16 replaced by suitably directed rollers.

Referring to FIGS. 15, 16 and 17, each shoe comprises a body, at one end of which there is mounted a device adapted to be extended telescopically at right angles to the sides of the trolley $b$. This device may comprise one or more rollers 54, or systems of the same, which, on being extended when the shoe is in a position to act on the vehicle, bears or bear against the contour of the corresponding wheel at the inner portion of the plan of the vehicle.

This roller or these rollers is or are mounted on a hydraulic cylinder 55 to the end or back 56 of which a liquid pipe 57 is led.

Each of these shoes has at the open side of its profile, which is in fact the side facing the inner face of the corresponding wheel, rollers 58, 59 (the latter being auxiliary) in those zones in which tangency with the wheel can occur horizontally. In this respect it has been found after very detailed study that, for a given height of operation of the shoe, the said rollers can be situated in a given position for all the wide range of dimensions of normal touring cars.

In order to provide other points of rolling contact, balls 60, 61 and 62 are used. However, it has been found that the rolling action of these balls also takes place about an axis of rotation of almost constant direction for all the motor vehicles in connection with which tests have been made and these balls may therefore be replaced by an equal number of suitably orientated rollers 60', 61', 62' (FIGURE 17).

With this object of concluding the explanation of those details which are shown particularly clearly in FIGS. 12, 13 and 14 it may be mentioned that the reference 63 designates the bearings on which the levers 24 turn and the reference 64 indicates the rollers which guide the inner part 18 of the trolley $b$ in the vertical direction.

Referring again to FIGURE 12, the movement of the shoes 37, 38 along the dash lines shown is produced in the following manner:

The trolly $b$ having been conveyed below the vehicle to be towed, the controls of the hydraulic circuits operating the shoes are actuated. By the action of the liquid in the cylinder 41, the rod 40 pulls the bar 30 against the action of the spring 39. The point of articulation of the scissors 33, 34, 43, 44 on the bar 30 is thereby shifted; the ends of the extensions 43, 44 which are articulated to the rods 45, 46 serve as fulcrums (although not immovable) and the shoes 37, 38 thus emerge laterally, while remaining parallel to themselves. The rods 45, 46 act as connecting rods, turning around the points 49, 50, respectively, but supporting the corresponding ends of the extensions 43, 44.

The same liquid under pressure which, acting in the cylinder 41, controls this movement, acts on the telescopically extensible portion of the rollers 54 which, being subjected only to the opposing force of their respective return springs, are extended even before the shoes have begun their travel. The latter undergoes a change when the rolling means (rollers or balls 58 to 62) of the shoes come into contact with the inner face of the corresponding wheel of the vehicle. Continuing the pressure action of the liquid the hydraulic devices 47, 48 then yield; reducing their length, and as a result the shoes, bearing firmly against the inner face of their corresponding wheels, are displaced until the roller 54 or assembly of rollers of each shoe succeeds in establishing contact with the periphery of the corresponding wheel. At this instant the conditions have been established where movement of the trolley causes movement of the vehicle which has been rendered fast with it. To retract the shoe system, it is sufficient to act on the suitably arranged return valves.

Figure 18:
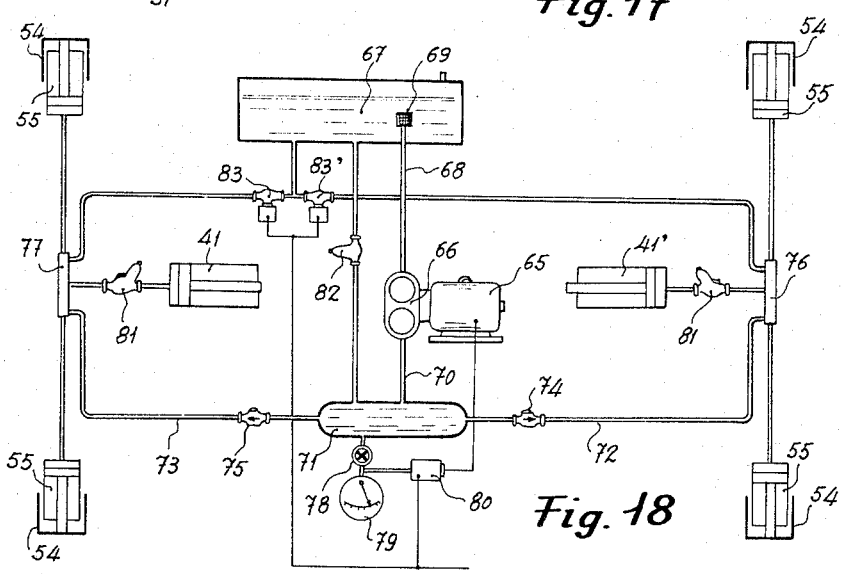
FIGURE 18 is a diagrammatic view of the hydraulic circuits for actuating the transversely extensible parts.

The hydraulic system is shown diagrammatically in FIGURE 18. The liquid is contained in a supply reservoir 67. A suitable pump (for example a geared pump 66) is driven by an electric motor 65. The liquid, passing through a filter 69, reaches the pump by way of a pipe 68. Through a pipe 70 liquid is conveyed under pressure to a small reservoir 71, from which pipes 72, 73 (in which are inserted non-return valves 74, 75) lead to distributors 76, 77. A manually operated valve 78 enables the indicator gauge 79 and the pressure-stat 80 to be subjected to the pressure of the reservoir 71 and, therefore, of the pipes leading from it; the pressure-stat acts on the motor 65.

The distributors 76, 77 carry the liquid under pressure to the means whose numerical designation corresponds to that used in other figures already described. Delivery to the cylinders 41, 41' is effected through respective gauge valves 81.

Each distributor 76, 77 has a return pipe controlled by one of the electrically controlled valves 83, 83'.

The pressure reservoir 71 is likewise provided with a return pipe controlled by the safety valve 82.

Referring now to FIGURE 19, it can be seen that the pair of hydraulic devices corresponding to each end of the trolley $b$ (that is the devices 47, 48 on the one hand and the devices 47', 48' on the other hand) are connected to a hydraulic accumulator 84 formed, by pressure, by a cylinder, a piston 85 and a compression spring acting on the latter.

Each hydraulic device is constituted by a cylinder and piston assembly. When the force of compression on the hydraulic devices increases (this happens when the shoes have already come into contact with the inner face of each wheel) the liquid contained in the same is displaced towards the accumulator 84, and this occurs with a degree of extension which may vary from one hydraulic device to the other. The passage of liquid from said hydraulic devices to the accumulator takes place through the respective non-return valves 86, 87, which are opened electrically, permitting the return of liquid when the assembly is to revert to the position of equilibrium.

The safety valve 82 must open at a pressure somewhat higher than that required for said hydraulic devices to displace their liquid, since otherwise operation of the latter would not occur.

Figure 21:
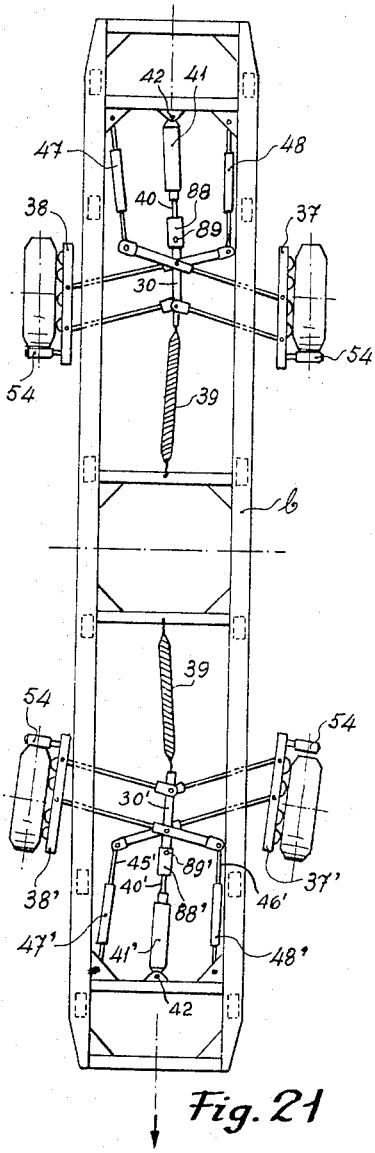
FIGURES 20 and 21 are further plan views of the dolly, the first clearly showing the adaptability of the device of the invention to vehicles having different tracks and wheel bases, and the second clearly showing the centering effect of the said device.
Figure 20:
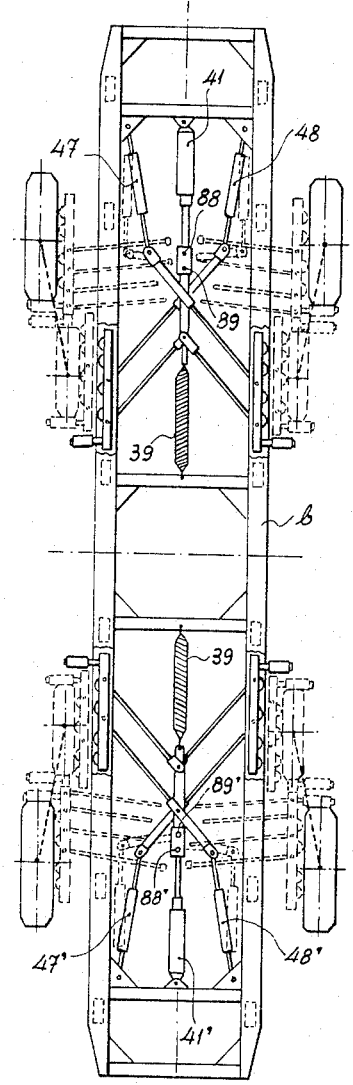

However, the hydraulic devices designed in this way have a number of other extremely advantageous features. FIGURES 20 and 21 illustrate these features.

This is of particular importance because of the fact that it is very improbable that the vehicle will be left in a position which is perfectly centered with respect to the extension of the trolley, even through appropriate markers may be provided in the garage or parking system.

FIGURE 20 shows how the trolley can be adapted to two motor vehicles of very different tracks and wheelbases.

FIGURE 21 shows particularly the self-centering state of the trolley described. Connection of the rods of the cylinders 41, 41', that is to say of the rod 40, to the bar 30 is effected by means of a pair of bolts 88, 89 or 88', 89', according to conditions.

The two bolts being in position, the bar 30 turns, in its process of adaptation, around the point 42. As a result of this, the associated shoes, being shifted parallel to the bar 30, form an increasing angle with the longitudinal direction of the trolley *b*.

If when, as shown in FIGURE 21, a car which is being moved by the trolley *b* in the direction indicated by the arrow, is not perfectly centered with respect to the same trolley, it can be centered as a result of the initial stage of the movement.

For this purpose, it will be sufficient, as shown by FIGURE 21, to keep in position the pair of bolts 88' and 89', corresponding to the shoes for the steered wheels, and to withdraw one bolt of the pair 88, 89 corresponding to the shoes of the non-steered wheels.

Inasmuch as the steering systems of motor vehicles always have a certain reversibility, the steered wheels will incline in the manner illustrated, thus assisting in the gradual centering of the car when it is towed.

The arrangement which permits this great adaptability is composed of the springs 39, the hydraulic devices 47, 48, 47', 48' and the bolts 88, 89, 88', 89'.

As has been indicated already, each cylinder 47, 48 has a piston joined to a rod 45, 46, and is fixed to the general frame by means of a ball-joint 49, 50 (FIGS. 12 and 21). When the cylinder 41 is operated, the rod 40, overcoming the action of the spring 39, displaces the turning pivots of the levers 43—33 and 35. When the shoe moves, its roller 54 makes contact with a wheel; this point, which is fixed at the moment, causes the stress load on the rod 40 to be transmitted to the rod 45, whose piston expels oil from the cylinder 47, which traverses the valve 86 and reaches the hydraulic accumulator 85, compressing the spring of its piston. At the moment of attaining the force necessary to be able to move the wheel by the thrust of the roller 54, oil is no longer expelled from the cylinder 47, and since the valve 86 prevents the passage of the oil from the accumulator 84, the rod 45 and cylinder 47 from a unit which is neither shortened nor lengthened, so that it may be described as assuming a rigid condition.

The oil contained in the cylinders 47, 48 and 84 is in a tubular circuit which is independent of that which operates the cylinder 41.

When a shoe 38' reaches in the course of its movement, a wheel before the corresponding shoes 37' reaches the second wheel of the same axle of the vehicle, as shown in the lower part of FIG. 21, then the complex of the cylinder 46' is shortened by the above described action, while the complex of the cylinder 47' and its rod 45' is not shortened, since the traction thrust of the rod 40 is limited to moving the shoe 37' until it reaches the corresponding wheel.

A greater shortening of members 46'–48' with respect to members 45'–47' causes the turning of the systems on their fixing pivots, and thus the shoes 37' and 38' adapt themselves to the wheels of the vehicle. As the rod 40' continues to operate, the oil in the two cylinders 47' and 48' is equally compressed and consequently their rods are uniformly arranged so that the shoes are forced to remain parallel to the axis of symmetry of the platform, and thus the wheels which said shoes guide, also remain parallel to said axis. The wheels straighten and are able to move the vehicle properly.

What we claim is:

1. A towing device for motor vehicles, comprising, in combination, a platform, means for moving said platform vertically and horizontally, a trolley carried by said platform and having longitudinally extensible telescopic members adapted to project from either side of said platform whereby said trolley can be placed beneath a vehicle that is located at a point spaced from either side of said platform, means carried by and movable transversely of said trolley for engaging the periphery and inner face of the wheels of the vehicle, whereby the vehicle can be carried to, on or from said platform, drive means for moving said extensible members, said drive means comprising power means carried by said platform, toothed wheels driven by said power means and independently engageable with each of said telescopic members to extend and retract same, in the extended position one of said members being disengaged from said toothed wheels and being disposed completely beyond said platform, the pitch diameter of the toothed wheels engageable with one of said telescopic members being different from the pitch diameter of the toothed wheels engageable with the other of said telescopic members, such that equal angular velocity of all of said toothed wheels will produce different linear velocities of said telescopic members, locking means mounted on said telescopic members and actuatable to lock said telescopic members relative to each other when one of said members is disengaged from said toothed wheels, means to actuate said locking means, said drive means further comprising trains of gears and entraining and braking means for controlling the extension, stopping and retraction of the said longitudinally extensible telescopic members.

2. A parking device for motor vehicles, comprising in combination, a platform, a trolley having an inner frame and an outer frame, said frames being slidable in longitudinal directions relatively to each other and to said platform, said inner frame having two outwardly directed parallel racks and said outer frame having two inwardly directed parallel racks, said racks extending in the longitudinal direction of said frames, sets of four pinions carried by said platform, near the portions thereof which constitute its ends with respect to said longitudinal directions constituting two pairs of like pinions which rotate at the same angular speed, two of said pinions meshing with the racks of said inner frame and two other pinions meshing with the racks of said outer frame, those pinions which mesh with the racks of the inner frame being of smaller pitch diameter, motor means carried by said platform and simultaneously driving said pinions, whereby the movement of translation of the inner frame is slower than that of the outer frame, so that the release of the racks of the latter with respect to its respective pinions is produced when the inner member is still in mesh with its pinions, a slower period of advance being thus produced in the last stage of extension or the first stage of retraction, anchoring means carried by said outer frame and movable transversely to the longitudinal direction of the frame for anchoring a vehicle by its wheels at the inner surfaces and the periphery thereof, locking means for locking the two frames relatively to each other, and means actuating the locking means when the racks of outer frame are out of engagement with said other pinions.

3. A trolley in accordance with claim 2, wherein the locking means for locking the two frames comprise two levers swingably mounted upon the outer frame, each of said levers having a beak, a recess adjacent said beak and a cam profile, a spring interconnecting said levers, and rollers carried by said inner frame and fitting into said recesses to interlock the frames; and bushes carried by said platform and adapted to engage said cam profiles for spreading said levers.

4. A trolley in accordance with claim 2, wherein the means for anchoring a vehicle comprise a central longitudinally movable bar, hydraulic means carried by said outer frame and actuating said bar, at least two opposed shoes adapted to engage the wheels of a vehicle, and two pairs of other bars having ends connected to the first-mentioned bar and other ends connected to said shoes, whereby said other ends may carry out arcuate movements to cause said other bars to extend perpendicularly to the first-mentioned bar.

5. A trolley in accordance with claim 2, wherein the means for anchoring a vehicle comprise a central longitudinally movable bar, hydraulic means carried by said outer frame and actuating said bar, four shoes, separate rotary members carried by each shoe and adapted to engage the wheels of a vehicle, one of the rotary members of each shoe consisting of a roller, hydraulic means actuating said roller, and other bars having ends connected to the first-mentioned bar and other ends connected to said shoes, whereby said other ends may carry out arcuate movements to cause said other bars to extend perpendicularly to the first-mentioned bar.

6. A trolley in accordance with claim 2, wherein the means for anchoring a vehicle comprise a central longitudinally movable bar, hydraulic means carried by said outer frame and actuating said bar, at least two opposed shoes adapted to engage the wheels of a vehicle, two other bars having ends connected to the first-mentioned bar and other ends connected to said shoes, two further scissor-like bars pivoted intermediate their ends to the first-mentioned bar, said further bars having ends connected to said shoes, other hydraulic means connected to other ends of said further bars, and means pivotally connecting said other hydraulic means to the first-mentioned hydraulic means.

7. A trolley in accordance with claim 6, further comprising a hydraulic accumulator, pipes connecting said other hydraulic means with said hydraulic accumulator, and valves carried by said pipes.

8. A trolley in accordance with claim 6, further comprising means carried by said outer frame and pivotally supporting the first-mentioned hydraulic means and said other hydraulic means, whereby when only one shoe engages an inner surface of a wheel the tractive force of the two hydraulic means alters the direction of the other shoes to shift the wheels of the vehicle.

References Cited by the Examiner

UNITED STATES PATENTS

| | | | |
|---|---|---|---|
| 715,004 | 12/1902 | Bertrand | 214—34 |
| 2,065,107 | 12/1936 | Turner et al. | |
| 2,788,905 | 4/1957 | Grove | 214—95 |
| 2,849,131 | 8/1958 | Smith et al. | |
| 2,851,961 | 9/1958 | Billings. | |
| 2,899,087 | 8/1959 | Jacobsen. | |

FOREIGN PATENTS 613,162  11/1960  Italy.

GERALD M. FORLENZA, *Primary Examiner.*

R. B. JOHNSON, *Assistant Examiner.*